US009083923B2

(12) United States Patent
Tanaka

(10) Patent No.: US 9,083,923 B2
(45) Date of Patent: Jul. 14, 2015

(54) IMAGE FORMING APPARATUS CONFIGURED FOR PRINTING USING COLOR EXPANSION TABLE

(71) Applicant: KYOCERA DOCUMENT SOLUTIONS INC., Osaka (JP)

(72) Inventor: Kazunori Tanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/189,912

(22) Filed: Feb. 25, 2014

(65) Prior Publication Data
US 2014/0240728 A1 Aug. 28, 2014

(30) Foreign Application Priority Data

Feb. 26, 2013 (JP) .................................. 2013-036479

(51) Int. Cl.
*H04N 1/60* (2006.01)
*G06K 15/02* (2006.01)
(52) U.S. Cl.
CPC .......... *H04N 1/6058* (2013.01); *G06K 15/1878* (2013.01)
(58) Field of Classification Search
None
See application file for complete search history.

(56) References Cited

U.S. PATENT DOCUMENTS

| 2008/0040319 A1* | 2/2008 | Quach ............................... 707/3 |
| 2009/0003696 A1* | 1/2009 | Ishii et al. ..................... 382/167 |
| 2011/0050695 A1* | 3/2011 | Sullivan et al. ............... 345/426 |
| 2013/0093783 A1* | 4/2013 | Sullivan et al. ............... 345/601 |

FOREIGN PATENT DOCUMENTS

| JP | 5-188728 A | 7/1993 |
| JP | 2007-166403 A | 6/2007 |

* cited by examiner

*Primary Examiner* — Dung Tran
(74) *Attorney, Agent, or Firm* — Studebaker & Brackett PC

(57) ABSTRACT

An image forming apparatus performs image formation of a target image with the use of a first color gamut as a standard color gamut for image formation. The image forming apparatus includes a storage section, a color conversion section, and an image forming section. The storage section stores a color expansion table indicating a second color gamut wider than the first color gamut. The color conversion section converts, when a color in the target image is present outside the first color gamut, a color value of the color in the target image to a color value of a coloring material used for image formation on the basis of the color expansion table. The image forming section performs image formation of the target image on the basis of the color value of the coloring material.

8 Claims, 7 Drawing Sheets

IMAGE FORMING APPARATUS CONFIGURED FOR PRINTING USING COLOR EXPANSION TABLE

INCORPORATION BY REFERENCE

The present application claims priority under 35 U.S.C. §119 to Japanese Patent Application No. 2013-036479, filed Feb. 26, 2013. The contents of this application are incorporated herein by reference in their entirety.

BACKGROUND

The present disclosure relates to image forming apparatuses.

In general, digital color multifunction peripherals reproduce a full color image by adjusting tones of four coloring materials (e.g., toner) in colors of cyan, magenta, yellow, and black. Combination of the four coloring materials determines a color gamut (reproducible color range) that the multifunction peripheral can reproduce. The range of the color gamut varies depending on the amount of the coloring materials placed on a recording medium (e.g., paper). The range of the color gamut also varies depending on the state of the coloring materials melted on paper at fusing. For example, the coloring materials in an insufficient melting state reduce the color gamut. While on the other hand, the coloring materials in a uniformly melted state can expand the color gamut.

Where a color according to input data falls inside the color gamut that a multifunction peripheral can output (i.e., print), the multifunction peripheral can reliably reproduce the color. However, in general, the color gamut in which colors can be reproduced as output is narrower than a color gamut in input color space (e.g., sRGB, adobe RGB, etc.). For this reason, where a color in input data falls outside of the color gamut for output, the color is compressed up to a color inside the color gamut for output. As a result, the tone is lost at a part of an input image which has high color intensity to lead to unreliable reproduction of colors in the image. Further, in order to reduce the amount of toner consumption, devices have been generally designed so as to reduce the amount of toner in transfer to paper. Accordingly, the tone at the part having high color intensity is liable to be lost for the above reasons.

Some image processing device selects a color conversion profile with an optimum color intensity compression rate for a color gamut of input data to prevent degradation at the part having high color intensity.

Furthermore, another image forming apparatus performs transfer and fusing of an image to a recording medium by a desired number of times to expand the color gamut.

SUMMARY

An image forming apparatus according to one mode of the present disclosure performs image formation of a target image with the use of a first color gamut as a standard color gamut for image formation. The image forming apparatus includes a storage section, a color conversion section, and an image forming section. The storage section stores a color expansion table indicating a second color gamut wider than the first color gamut. The color conversion section converts, when a color in the target image is present outside the first color gamut, a color value of the color in the target image to a color value of a coloring material used for image formation on the basis of the color expansion table. The image forming section performs image formation of the target image on the basis of the color value of the coloring material.

An image forming method according to another mode of the present disclosure is a method by which an image forming apparatus performs image formation of a target image with the use of a first color gamut as a standard color gamut for image formation. The method includes a first step and a second step. The first step is converting, when a color in the target image is present outside the first color gamut, a color value of the color in the target image to a color value of a coloring material used for image formation on the basis of a color expansion table indicating a second color gamut wider than the first color gamut. The second step is performing image formation of the target image on the basis of the color value of the coloring material.

DETAILED DESCRIPTION

Embodiments of the present disclosure will be described below with reference to the accompanying drawings.

Figure 1:
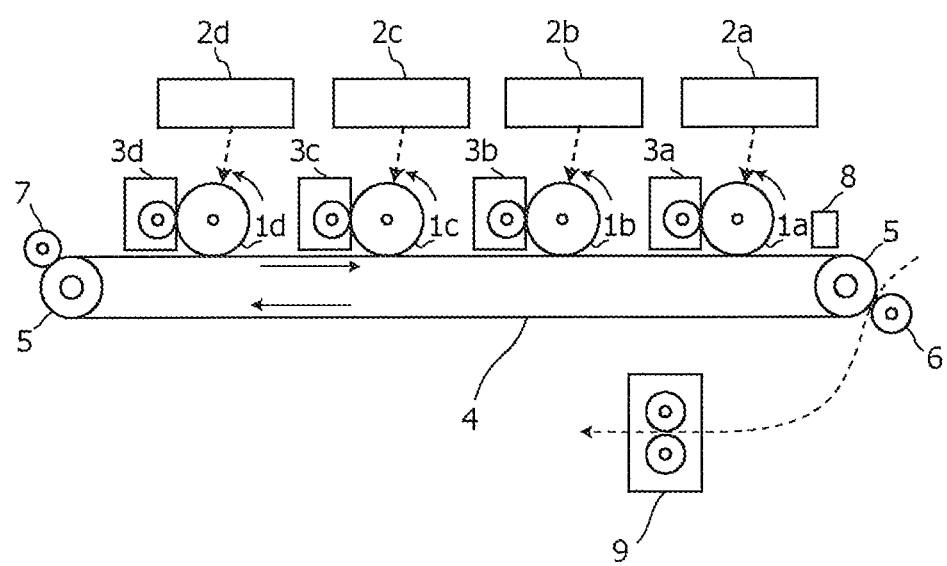
FIG. 1 is an illustration showing one example of a mechanical configuration of an image forming apparatus according to one embodiment.

FIG. 1 is an illustration showing one example of a mechanical configuration of an image forming apparatus according to the present embodiment. The image forming apparatus may be an image forming apparatus having an electrographic printing function, such as a printer, a facsimile machine, a copier, or a multifunction peripheral. It is noted that printing in the present embodiment means both printing based on print request data received from an external device and printing based on image data read by a scanner, i.e., printing as copying.

The image forming apparatus according to the present embodiment includes a color developing device of tandem type. The color developing device includes photosensitive drums 1a-1d, exposure devices 2a-2d, and developing devices 3a-3d. The photosensitive drums 1a-1d are photoreceptors for four colors of cyan (C), magenta (M), yellow (Y), and black (K). The exposure devices 2a-2d are devices that irradiate laser light to the photosensitive drums 1a-1d, respectively, to form electrostatic latent images. Each exposure device 2a-2d is a laser scanning unit including a laser diode as a light source for the laser light and optical elements (lens, minor, polygon minor, etc.) that guide the laser light to the corresponding photosensitive drums 1a-1d.

Further, a charger, such as a scorotron or the like, a cleaner, a static eliminator, etc. are provided around each photosensitive drum 1a-1d. The cleaner removes residual toner on the corresponding photosensitive drum 1a-1d after primary transfer. The static eliminator removes static electricity on the corresponding photosensitive drum 1a-1d after primary transfer.

Toner containers filled with toner in corresponding colors of cyan, magenta, yellow, and black are fitted in the developing devices 3a-3d, respectively. The toner in the toner containers is supplied to the corresponding developing devices 3a-d. The toner supplied to the developing devices 3a-3d forms developer in combination with a carrier. The respective developing devices 3a-3d cause the supplied toner to be attached to the electrostatic latent images on the corresponding photosensitive drums 1a-1d to form toner images on the photosensitive drums 1a-1d.

In the present embodiment, a magenta image is developed using the photosensitive drum 1a, the exposure device 2a, and the developing device 3a. A cyan image is developed using the photosensitive drum 1b, the exposure device 2b, and the developing device 3b. A yellow image is developed using the photosensitive drum 1c, the exposure device 2c, and the developing device 3c. A black image is developed using the photosensitive drum 1d, the exposure device 2d, and the developing device 3d.

An intermediate transfer belt 4 is an annular image bearing member which is in contact with the photosensitive drums 1a-1d and to which the toner images on the photosensitive drums 1a-1d are primarily transferred. The intermediate transfer belt 4 is wound to drive rollers 5 to be rotated by the drive force from the drive rollers 5 in the direction from a contact point in contact with the photosensitive drum 1d to a contact point in contact with the photosensitive drum 1a.

The transfer roller 6 causes paper conveyed thereto to come in contact with the intermediate transfer belt 4 and secondarily transfers the toner images on the intermediate transfer belt 4 to the paper. It is noted that the paper to which the toner images are transferred is conveyed to a fusing device 9. Thereafter, the fusing device 9 fuses the toner images to the paper.

A roller 7 includes a cleaning brush. The roller 7 causes the cleaning brush to come in contact with the intermediate transfer belt 4 to remove toner remaining on the intermediate transfer belt 4 after transfer of the toner images to the paper.

A sensor 8 is used for toner density adjustment. The sensor 8 irradiates a light beam to the intermediate transfer belt 4 to detect the reflected light.

Figure 2:
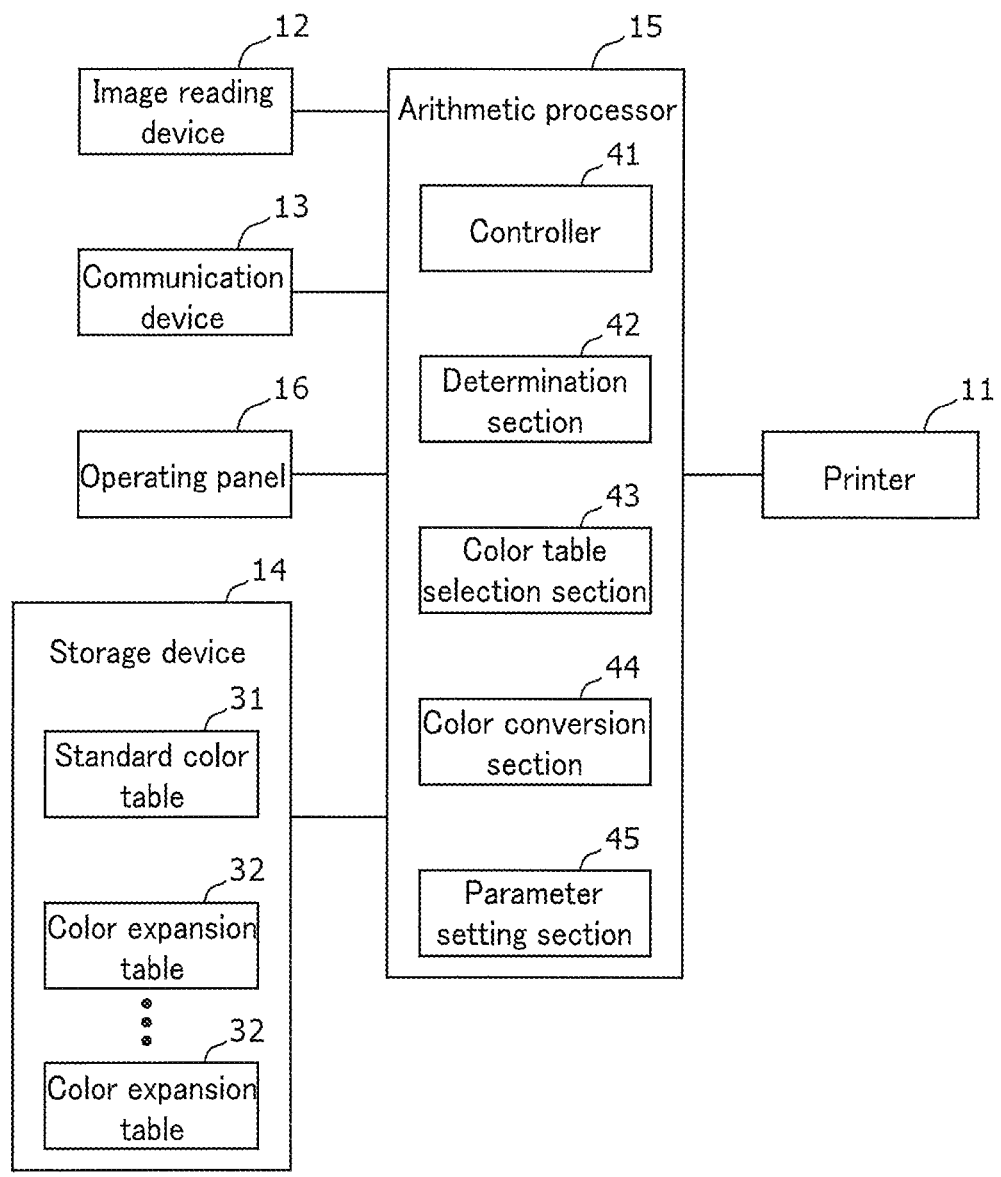
FIG. 2 is an illustration showing one example of an internal configuration of the image forming apparatus according to the embodiment.

FIG. 2 is an illustration showing one example of an internal configuration of the image forming apparatus according to the present embodiment.

As shown in FIG. 2, the image forming apparatus according to the present embodiment includes a printing device 11, an image reading device 12, a communication device 13, a storage device 14, an arithmetic processor 15, and an operating panel 16.

The printing device 11 (image forming section) has a mechanical configuration shown in FIG. 1 to print a color image based on image data after color conversion in the arithmetic processor 15.

The image reading device 12 is an internal device that optically reads a document image from an original document and generates color image data of the document image.

The communication device 13 performs data communication with an external computer, such as a host computer (not shown) through a communication network, such as a local area network (LAN). The communication device 13 receives print request data, such as page description language (PDL) data from, for example, the host computer through the communication network.

The storage device 14 (storage section) is a nonvolatile storage device, such as a flash memory. The storage device 14 stores a standard color table 31 and one or more (plural in the present embodiment) color expansion tables 32.

The standard color table 31 indicates a standard color gamut based on standard maximum amounts of toner in the respective plural toner colors and is used for converging a color in a to-be-printed-image in the standard color gamut. Herein, the standard maximum amount of toner (first coloring material amount) means an amount of toner necessary for expressing the standard color gamut (first color gamut). In using the standard color table 31, a color in the standard color gamut is not changed. By contrast, a color outside the standard color gamut is changed to a color within the standard color gamut.

The standard color table 31 in the present embodiment is a table for converting a color value of a color in a to-be printed image to color value sets of cyan, magenta, and yellow corresponding to a* values and b* values in L*a*b* space.

Each color expansion table 32 indicates an expanded color gamut wider than the standard color gamut and is used for converging a color in a to-be-printed image in the expanded color gamut. In using any color expansion table 32, a color in the expanded color gamut is not changed. By contrast, a color outside the expanded color gamut is changed to a color inside the expanded color gamut. Each expanded color gamut can be obtained by changing each maximum amount of toner in one or more colors to an extended amount of the toner larger than the standard maximum amount of the corresponding toner. Herein, the maximum amount of toner means an amount of toner necessary for expressing a color gamut. The maximum amount of toner in the standard color gamut is the standard maximum amount of toner. The maximum amount of toner (second coloring material amount) in an expanded color gamut is an amount of toner necessary for expressing the expanded color gamut (second color gamut). The maximum amount of toner in an expanded color gamut is the standard maximum amount of toner or the extended amount of toner.

The storage section 14 stores the plurality of color expansion tables 32 in addition to information for specifying a color gamut.

Each of the standard color table 31 and the color expansion tables 32 has information on the maximum amounts of toner in the respective toner colors (CMY).

The plurality of color expansion tables 32 are different from each other in toner color of which the standard maximum amount is changed to the extended amount of toner and/or extended amount of toner.

The storage section 14 stores the plurality of color expansion tables 32 based on plural steps (four in the present embodiment) of extended amounts for each of cyan, magenta, and yellow colors. In other words, five steps including the standard maximum amount of toner are set in total for the maximum amount of toner in the present embodiment. Accordingly, the storage section 14 stores 124 (=5*5*5−1) color expansion tables 32.

Figure 3:
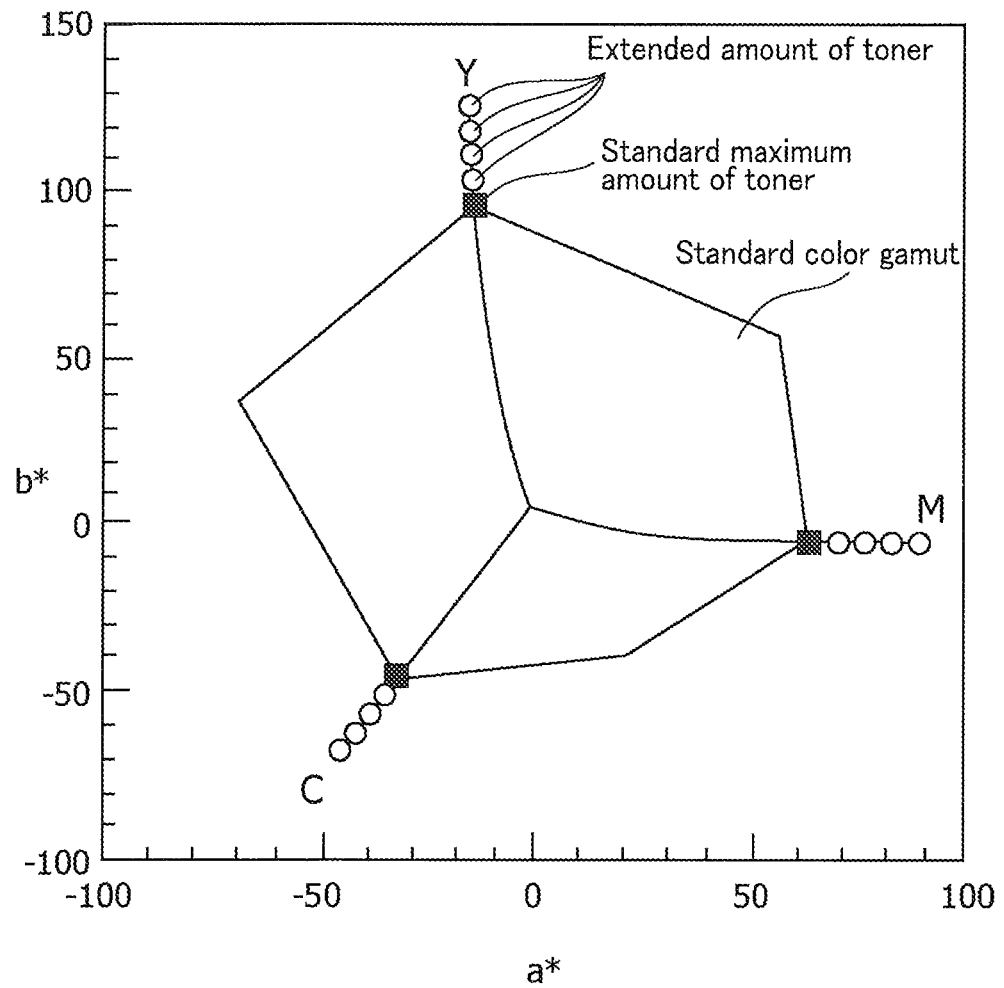
FIG. 3 is an illustration showing one example of a standard color gamut.

FIG. 3 is an illustration showing one example of the standard color gamut. The standard color gamut on an a*-b* plane is a color region within which colors can be expressed with color toner (CMY) of respective amounts of toner equal to or smaller than the corresponding standard maximum amounts of toner.

In one example, where each standard maximum amount of toner is 0.45 mg/cm$^2$, the respective extended amounts of toner are set at four of 0.50 mg/cm$^2$, 0.55 mg/cm$^2$, 0.60 mg/cm$^2$, and 0.65 mg/cm$^2$.

Figure 4:
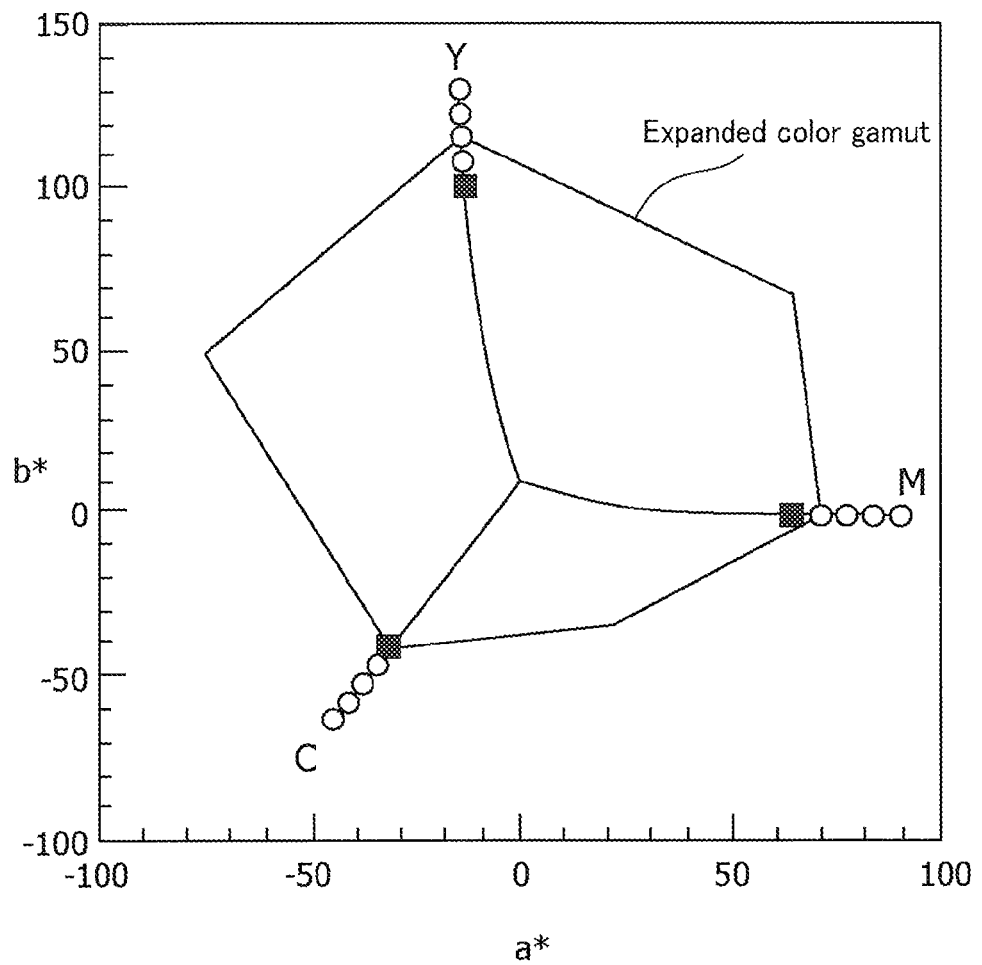
FIG. 4 is an illustration showing one example of an expanded color gamut.

FIG. 4 is an illustration showing one example of the expanded color gamuts. The expanded color gamut shown in FIG. 4 is an expanded color gamut in which the maximum amounts of toner in the cyan, magenta, and yellow colors are the standard maximum amount of toner, the smallest extended amount of toner, and the second smallest extended amount of toner, respectively. The color expansion table for this expanded color gamut is one of the plural color expansion tables 32 stored in the storage section 14.

It is noted that each color gamut can be obtained in a manner that a color chart including a plurality of color patches is printed, the colors of each printed patch are measured, and then, the measured color values are plotted in the L*a*b* space. In general, the larger the amounts of toner transferred to paper are, the wider the color gamut becomes. However, the expansion of the color gamut is finally saturated. Usually, in order to reduce toner consumption, each standard maximum amount of toner is set at a low amount of toner at which expansion of the color gamut is not saturated. Accordingly, as described above, any color gamut can be expanded by changing the maximum amount of toner in any toner color from the standard maximum amount of toner to an extended amount of toner.

The arithmetic processor 15 includes an application specific integrated circuit (ASIC) and/or a microcomputer. The arithmetic processor 15 realizes various types of processing sections by means of hardware and/or software. The arithmetic processor 15 can realize a controller 41, a determination section 42, a color table selection section 43, a color conversion section 44, and a parameter setting section 45.

The controller 41 controls the image reading device 12 to obtain image data of a document image (original image data of to-be-printed image). Further, the controller 41 generates original image data of a to-be-printed image from print request data received from the communication device 13. Moreover, the controller 41 causes the printing device 11 to print an image based on image data after resolution conversion, color conversion, screen processing, etc. in the arithmetic processor 15.

The determination section 42 determines whether or not any colors in a to-be-printed image are present outside the standard color gamut. Where the original image data of a to-be-printed image is RGB data, the determination section 42 converts the RGB data to L*a*b* data. Then, the determination section 42 determines by referencing the standard color table 31 whether or not the (a*, b*) values of all pixels of the original image data are present inside the standard color gamut.

The color table selection section 43 selects one color expansion table 32 for actual use from the plurality of color expansion tables 32. The color table selection section 43 selects a color expansion table 32 of which total sum of the maximum amounts of toner in the plural toner colors is the smallest among the plurality of color expansion tables 32 each indicating the expanded color gamut capable of expressing a color in the to-be-printed image outside the standard color gamut, that is, the expanded color gamut that includes in its inside the color present outside the standard color gamut. Herein, each maximum amount of toner is an extended amount of toner where the maximum amount of toner is changed to an extended amount of toner, and is the standard maximum amount of toner where it is not changed to any extended amount of toner.

When a color in the to-be-printed image is present outside the standard color gamut and inside an expanded color gamut indicated in the selected color expansion table 32, the color conversion section 44 converts the color value of the color in the to-be-printed image to a color value of the toner colors on the basis of the color expansion table 32 selected by the color table selection section 43. At this time, the color value of the color in the original image data (e.g., RGB value or color value in L*a*b* space after conversion) is converted to a color value (CMYK value) of a color capable of being expressed with the color toner in amounts equal to or smaller than the maximum amounts of the respective color toner.

In other words, the color present outside the standard color gamut and inside the expanded color gamut indicated in the selected color expansion table 32 is not changed to a color inside the standard color gamut and remain as its original color even after color conversion.

The color conversion section 44 in the present embodiment converts the color value of the color in the to-be-printed image to a color value of the toner colors on the basis of the color expansion table 32 selected by the color table selection section 43.

When the color value of the color in the to-be-printed image is converted to the color value of the toner colors on the basis of the color expansion table 32, the parameter setting section 45 changes the value of a parameter relating to operation of the printing device 11 (hereinafter referred to as "operation parameter"). Specifically, the parameter setting section 45 changes the value of the operation parameter from the value corresponding to the standard maximum amounts of toner to the value corresponding to the extended amounts of toner.

In the present embodiment, the operation parameter of the printing device 11 is a fusing temperature and/or a nip width of the fusing device 9 in the printing device 11. In one example, according to the total sum of the maximum amounts of toner in each toner color (CMY) (or total sum of maximum amounts of toner in each toner color (CMYK) including black color) in the selected color gamut, the parameter setting section 45 sets the fusing temperature at a temperature at which the toner in the total toner amount of the maximum amounts of the toner can be melt.

Further, the operating panel 16 (user input section) includes a display device and an input device. The display device displays various types of messages and information to the user. The input device detects user's manipulation. The operating panel 16 receives input information that specifies whether or not to use an color expansion table 32.

An operation of the image forming apparatus according to the present embodiment will be described next.

Figure 5:
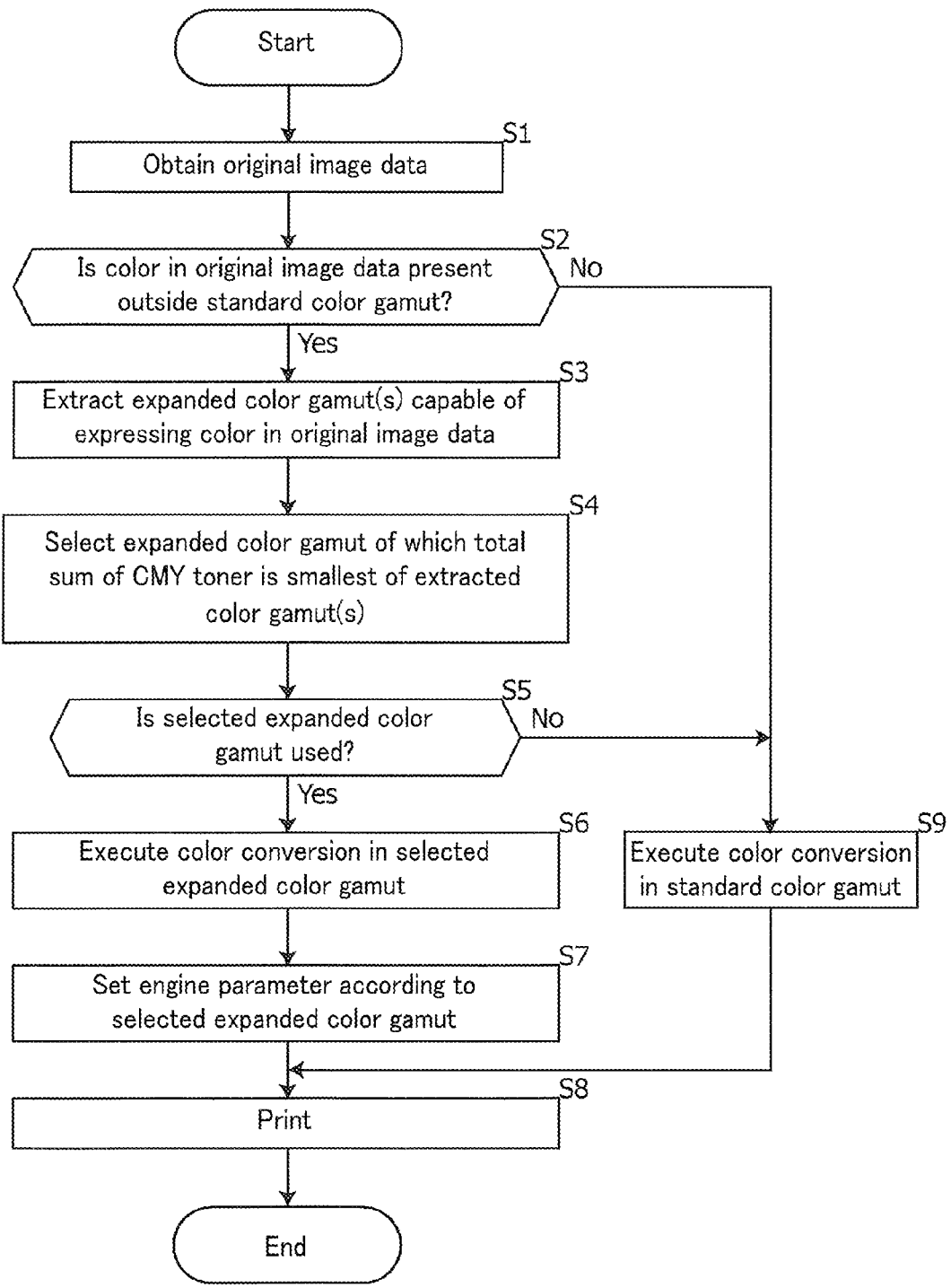
FIG. 5 is a flowchart for color conversion that the image forming apparatus according to the embodiment performs.

FIG. 5 is a flowchart of color conversion that the image forming apparatus according to the present embodiment performs.

First, the controller 41 obtains the original image data of a to-be-printed image (input image) (step S1). The determination section 42 converts the obtained original image data to L*a*b* data. Then, the determination section 42 determines whether or not any colors in the to-be-printed image are present outside the standard color gamut by referencing the L*a*b* data obtained by conversion and the standard color tables 31 (step S2).

When a color in the to-be-printed image is present outside the standard color gamut, the color table selection section 43 extracts one or more color expansion tables 32 each of which indicates an expanded color gamut capable of expressing the color present outside the standard color gamut out of the plurality of color expansion tables 32 stored in the storage device 14 (step S3). Then, the color table selection section 43 calculates the total sum of the maximum amounts of toner in all the colors in each extracted color expansion table 32. Next, the color table selection section 43 selects the color expansion table 32 of which calculated total sum of the maximum amounts of toner is the smallest as a color expansion table 32 for actual use (step S4).

Figure 6:
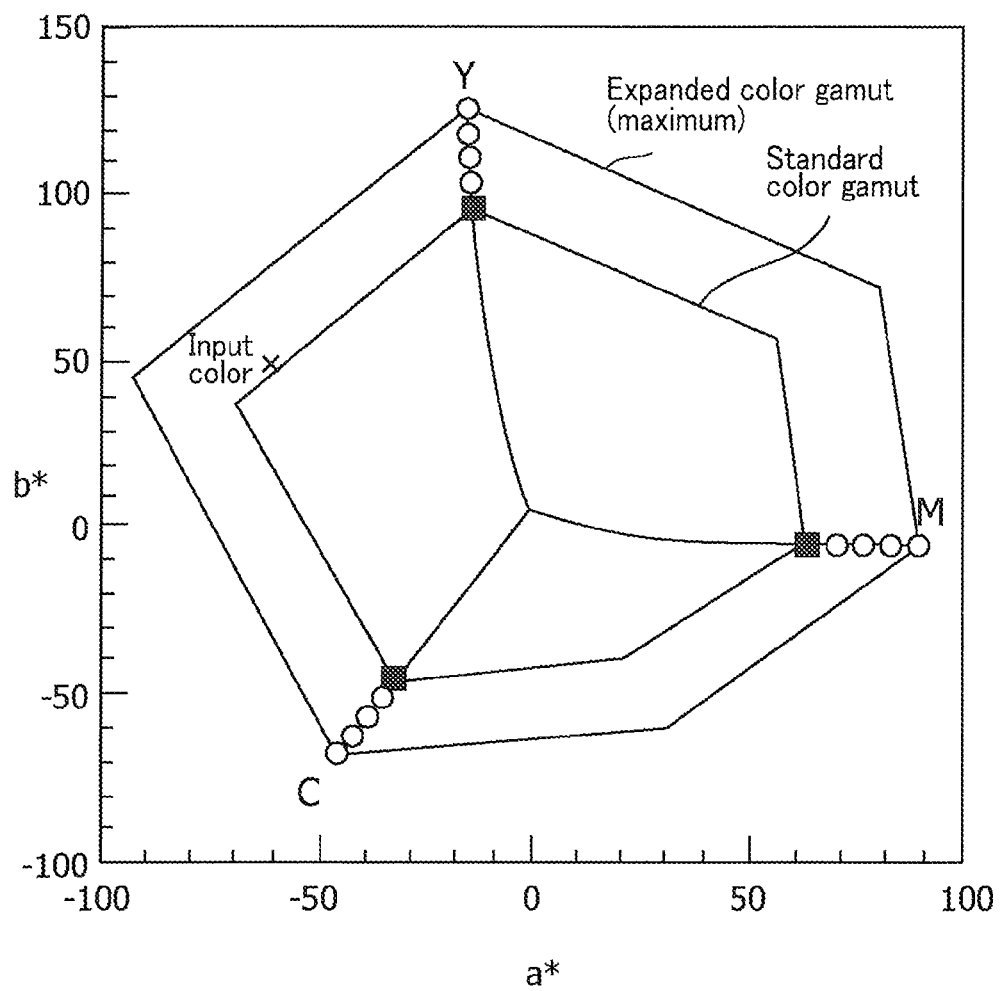
FIG. 6 is an illustration showing one example where an input color falls outside the standard color gamut.
Figure 7:
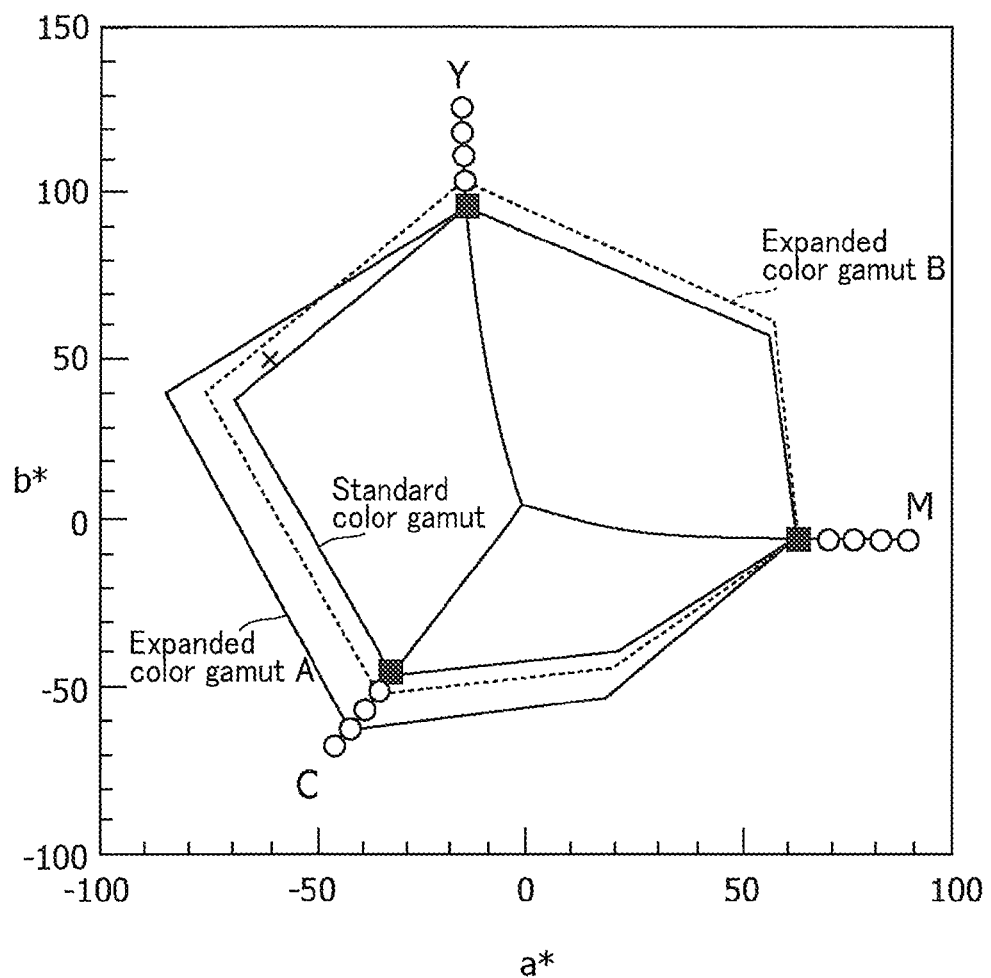
FIG. 7 is an illustration showing examples of expanded color gamuts capable of reproducing the input color shown in FIG. 6.

FIG. 6 is an illustration showing one example where an input color is present outside the standard color gamut. FIG. 7 is an illustration showing examples of the expanded color gamuts capable of expressing the input color shown in FIG. 6.

When a color in the original image data is present outside the standard color gamut, as shown in FIG. 6, one or more color expansion tables 32 are extracted each of which indicates one expanded color gamut capable of expressing the color, as shown in FIG. 7. In the example shown in FIG. 7, a color expansion table 32 indicating an expanded color gamut A and a color expansion table 32 indicating an expanded color gamut B are extracted.

In one example, where each standard maximum amount of toner is 0.45 mg/cm$^2$, and the extended amount of each toner is set at four steps of 0.50 mg/cm$^2$, 0.55 mg/cm$^2$, 0.60 mg/cm$^2$, and 0.65 mg/cm$^2$, the total toner amount (total sum of the maximum amounts of toner in all the colors) in the expanded color gamut A is 1.50 (=0.60+0.45+0.45) mg/cm$^2$. By contrast, the total toner amount in the expanded color gamut B is 1.45 (=0.50+0.45+0.50) mg/cm$^2$. In this case, since the total toner amount in the expanded color gamut B is smaller than that in the expanded color gamut A, the color expansion table 32 indicating the expanded color gamut B is selected.

Referring back to FIG. 5, description of the color conversion will be continued. After execution of the step S4, the color table selection section 43 causes the operating panel 16 to display a massage inquiring which mode is to be selected between a color conversion mode using the standard color table 31 by compressing the color gamut and a color conversion mode using the selected color expansion table 32 without compressing the color gamut. At this time, the color table selection section 43 may cause the operating panel 16 to display a massage inquiring which mode is to be selected between a mode in which toner consumption is not increased by compressing the color gamut (toner amount priority mode using the standard color table) and a mode in which toner consumption amount increases without compressing the color gamut (image quality priority mode using the selected color expansion table 32).

Then, when the user viewing the message manipulates the operating panel 16 to select one of the modes, the manipulation information on that manipulation is sent from the operating panel 16 to the arithmetic processor 15.

Thereafter, the color conversion section 44 determines whether or not the color conversion mode using the color expansion table 32 is selected on the basis of the manipulation information (step S5).

When the color conversion mode using the color expansion table 32 is selected, the color conversion section 44 converts the original image data to CMYK data with the use of the color expansion table 32 selected by the color table selection section 43 (step S6). Then, the parameter setting section 45 sets the operation parameter of the printing device 11 (print engine parameter) at the value of the operation parameter corresponding to the selected color expansion table 32 (step S7). Thereafter, the controller 41 causes the printing device 11 to print the image based on the CMYK data obtained by conversion at step S6 (step S8).

By contrast, when no color in the to-be-printed image is present outside the standard color gamut in step 2, or the color conversion mode using the color expansion table 32 is not selected (i.e., the color conversion mode using the standard color table 32 is selected) in step S5, the color conversion section 44 converts the original image data to CMYK data with the use of the standard color table 31 (step S9). At this time, any colors outside the standard color gamut are converted to colors inside the standard color gamut. Thereafter, the controller 41 causes the printing device 11 to print an image based on the CMYK data obtained by conversion in step S9 (step S8).

As described above, the image forming apparatus according to the present embodiment includes the color expansion tables 32. Each color expansion table 32 indicates an expanded color gamut which is wider than the standard color gamut based on the respective standard maximum amounts of toner in plural colors and which is obtained by changing each maximum amount of one or more color toner to an extended amount of toner larger than the standard maximum amount of toner. When a color in the to-be-printed image is present outside the standard color gamut and inside an expanded color gamut indicated in any of the color expansion tables 32, the color conversion section 44 converts a color value of the color in the to-be-printed image to a color value of the toner colors on the basis of the selected color expansion table 32. Then, the printing device 11 prints the image on the basis of the color value of the toner colors obtained by conversion based on the color expansion table 32.

This can expand the color gamut at printing as necessary while suppressing an increase in printing time period.

It is noted that although the present embodiment is one example of the present disclosure, the present disclosure is not limited thereto. Various changes and alterations are possible within the scope not departing from the subject matter of the present disclosure.

What is claimed is:

1. An image forming apparatus which performs image formation of a target image with the use of a first color gamut as a standard color gamut for image formation, comprising:
   a storage section configured to store a color expansion table indicating a second color gamut wider than the first color gamut;
   a color conversion section configured to convert, when a color in the target image is present outside the first color gamut, a color value of the color in the target image to a color value of a coloring material used for image formation on the basis of the color expansion table; and
   an image forming section configured to perform image formation of the target image on the basis of the color value of the coloring material,
   wherein the storage section stores a plurality of the color expansion tables respectively indicating one of the plurality of the second color gamuts,
   each of the second color gamuts is made correspondence with a second coloring material amount as an amount of coloring material necessary for expressing the corresponding second gamut,
   the image forming apparatus further comprising:
   a color table selection section configured to select, when the color in the target image is present outside the first color gamut, one color expansion table from one or more color expansion tables each of which indicates the second color gamut, which includes inside thereof the color outside the first color gamut, out of the plurality of the second color gamuts on the basis of the second coloring material amount,
   wherein the color conversion section converts the color value of the target image to the color value of the coloring material on the basis of the color expansion table selected by the color table selection section.

2. An image forming apparatus according to claim 1, wherein
when the color in the target image is present outside the first color gamut and inside the second color gamut, the color conversion section converts the color value of the color in the target image to the color value of the coloring material on the basis of the color expansion table.

3. An image forming apparatus according to claim 1, further comprising:
a user input section configured to receive input information which specifies whether or not to use the color expansion table,
wherein when the color in the target image is present outside the first color gamut upon specification of use of the color expansion table according to the input information, the color conversion section converts the color value of the color in the target image to the color value of the coloring material on the basis of the color expansion table.

4. An image forming apparatus according to claim 1, wherein
each of the second color gamuts is made correspondence with a plurality of the second coloring material amounts for each of a plurality of coloring materials different in color, and
the color table selection section selects an color expansion table indicating a second color gamut of which a total sum of the corresponding plurality of the second coloring material amounts is the smallest of one or more second color gamuts which include inside thereof the color outside the first color gamut.

5. An image forming apparatus according to claim 4, wherein
the first color gamut is made correspondence with a plurality of first coloring material amounts for the plurality of coloring materials different in color as amounts of coloring materials necessary for expressing the first color gamut,
each second color gamut is obtained by changing at least one of the plurality of first coloring material amounts in the first color gamut to a second coloring material amount larger than the first coloring material amount, and
the second color gamuts are different from each other in the second coloring material amount of at least one coloring material of the plurality of coloring materials different in color.

6. An image forming apparatus according to claim 5, further comprising:
a parameter setting section configured to change, when the color value of the color in the target image is converted to the color value of the coloring material on the basis of the color expansion table, a value of the parameter relating to the operation of the image forming section from a value corresponding to the first coloring material amount to a value corresponding to the second coloring material amount.

7. An image forming apparatus according to claim 4, wherein
the coloring materials are toner in different colors, and the different colors are cyan, magenta, and yellow.

8. An image forming apparatus which performs image formation of a target image with the use of a first color gamut as a standard color gamut for image formation, comprising:
a storage section configured to store a color expansion table indicating a second color gamut wider than the first color gamut;
a color conversion section configured to convert, when a color in the target image is present outside the first color gamut, a color value of the color in the target image to a color value of a coloring material used for image formation on the basis of the color expansion table;
an image forming section configured to perform image formation of the target image on the basis of the color value of the coloring material; and
a parameter setting section configured to change a value of the parameter relating to the operation of the image forming section when the color value of the color in the target image is converted to the color value of the coloring material on the basis of the color expansion table, wherein
the parameter relating to the operation of the image forming section is a fusing temperature and/or a nip width in image formation.

* * * * *